United States Patent
Laurens

(10) Patent No.: US 9,604,731 B2
(45) Date of Patent: Mar. 28, 2017

(54) MEASUREMENT SYSTEM FOR MEASURING THE VELOCITY OF AN AIRCRAFT

(71) Applicant: Airbus Operations (S.A.S.), Toulouse (FR)

(72) Inventor: Pascal Laurens, Saint Paul sur Save (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 14/710,319

(22) Filed: May 12, 2015

(65) Prior Publication Data

US 2015/0329216 A1    Nov. 19, 2015

(30) Foreign Application Priority Data

May 13, 2014   (FR) ...................... 14 54230

(51) Int. Cl.
*B64D 43/02* (2006.01)
*G01P 13/02* (2006.01)
(Continued)

(52) U.S. Cl.
CPC ............ *B64D 43/02* (2013.01); *G01C 23/00* (2013.01); *G01P 5/001* (2013.01); *G01P 5/14* (2013.01); *G01P 13/025* (2013.01)

(58) Field of Classification Search
CPC .......... G01P 13/025; G01P 5/001; G01P 5/02; G01P 5/14; B64D 43/02; G01F 1/34
See application file for complete search history.

(56) References Cited

U.S. PATENT DOCUMENTS 3,292,544 A * 12/1966 Caldwell ................. F42B 10/46
                                                        244/159.1
5,117,687 A *  6/1992 Gerardi ................... G01L 5/161
                                                        73/170.15
(Continued)

FOREIGN PATENT DOCUMENTS

DE          29720539 U1 *  1/1998    ............. B64D 43/02
DE          19637483 A1 *  3/1998    ............. B05D 7/00
(Continued)

OTHER PUBLICATIONS

Brown, E. N. et al., "The use of pressure fluctuations on the nose of an aircraft for measuring air motion", Journal of Climate and Applied Meteorology, vol. 22, Jan. 1983, pp. 171-180.*
(Continued)

*Primary Examiner* — Behrang Badii
*Assistant Examiner* — David Testardi
(74) *Attorney, Agent, or Firm* — Jenkins, Wilson, Taylor & Hunt, P.A.

(57) ABSTRACT

The disclosure herein relates to a measurement system to measure characteristics of the velocity vector of an aircraft in relation to a surrounding air mass, the measurement system comprising—a frontal surface of the aircraft, two primary sensors, each being fixed to the frontal surface of the aircraft and able to deliver an output value relating to the deformation experienced by the sensor, and a processing unit able to receive the output values and able to calculate the angle of attack and/or the velocity of the aircraft on the basis of these output values.

9 Claims, 1 Drawing Sheet

(51) Int. Cl.
*G01C 23/00* (2006.01)
*G01P 5/00* (2006.01)
*G01P 5/14* (2006.01)

(56) References Cited

U.S. PATENT DOCUMENTS

| | | | |
|---|---|---|---|
| 5,616,861 | A | 4/1997 | Hagen |
| 5,797,105 | A * | 8/1998 | Nakaya ............... G01P 5/165 244/177 |
| 6,250,149 | B1 * | 6/2001 | Black .................. B64D 43/02 374/E13.006 |
| 6,253,166 | B1 * | 6/2001 | Whitmore ............ G01P 13/025 700/89 |
| 6,439,048 | B1 * | 8/2002 | Hui ..................... G01P 13/025 73/181 |
| 6,672,152 | B2 * | 1/2004 | Rouse .................. G01P 13/025 73/170.01 |
| 6,752,020 | B1 * | 6/2004 | Sobotta ................ B64D 47/00 73/702 |
| 8,714,006 | B2 | 5/2014 | Wagner et al. |
| 9,075,074 | B2 | 7/2015 | Fischenberg |
| 2001/0054311 | A1 * | 12/2001 | Hakenesch ............ G01L 5/16 73/170.02 |
| 2003/0126923 | A1 * | 7/2003 | Schulze ................ B64D 43/02 73/170.14 |
| 2005/0131591 | A1 * | 6/2005 | Drutowski ........... G01P 13/025 701/3 |
| 2012/0041634 | A1 * | 2/2012 | Madhavanpillai ....... G01P 5/16 701/30.1 |
| 2014/0229139 | A1 * | 8/2014 | Hegenbart ............ G01P 5/001 702/144 |

FOREIGN PATENT DOCUMENTS

| | | | | |
|---|---|---|---|---|
| GB | 152119 | A | | 10/1920 |
| GB | 2274170 | A | * | 7/1994 ............... G01P 5/14 |
| JP | 2001194265 | A | * | 7/2001 |
| JP | 2003237696 | A | * | 8/2003 |
| WO | WO 2011/023270 | A1 | | 3/2011 |

OTHER PUBLICATIONS

Cobleigh, Brent R. et al., "Flush airdata sensing (FADS) system calibration procedures and results for blunt forebodies", NASA Technical Paper, Report No. NASA/TP-1999-209012, Nov. 1999, 32 pages.*

Jost, M. et al., "Flush air data system—an advanced air data system for the aerospace industry", AIAA Guidance, Navigation, and Control Conference and Exhibit, Aug. 16-19, 2004, Providence, R.I., paper AIAA 2004-5028, 16 pages.*

Larson, Terry J. et al., "Subsonic tests of an all-flush-pressure-orifice air data system", NASA Technical Paper 1871, Jun. 1981, 51 pages.*

Rohloff, Thomas J. et al., "Fault-tolerant neural network algorithm for flush air data sensing", Journal of Aircraft, vol. 36, No. 3, May-Jun. 1999, pp. 541ff.*

Whitmore, Stephen A. et al., "In-flight demonstration of a real-time flush airdata sensing (RT-FADS) system", NASA Technical Memorandum 104314, Oct. 1995, 20 pages.*

Young, Jennifer Baliles, "X-31 vector program summary", AIAA Guidance, Navigation, and Control Conference and Exhibit, Aug. 16-19, 2004, Providence, R.I., paper AIAA 2004-5026, 9 pages.*

French Search Report for Application No. 1454230 dated Oct. 9, 2014.

* cited by examiner

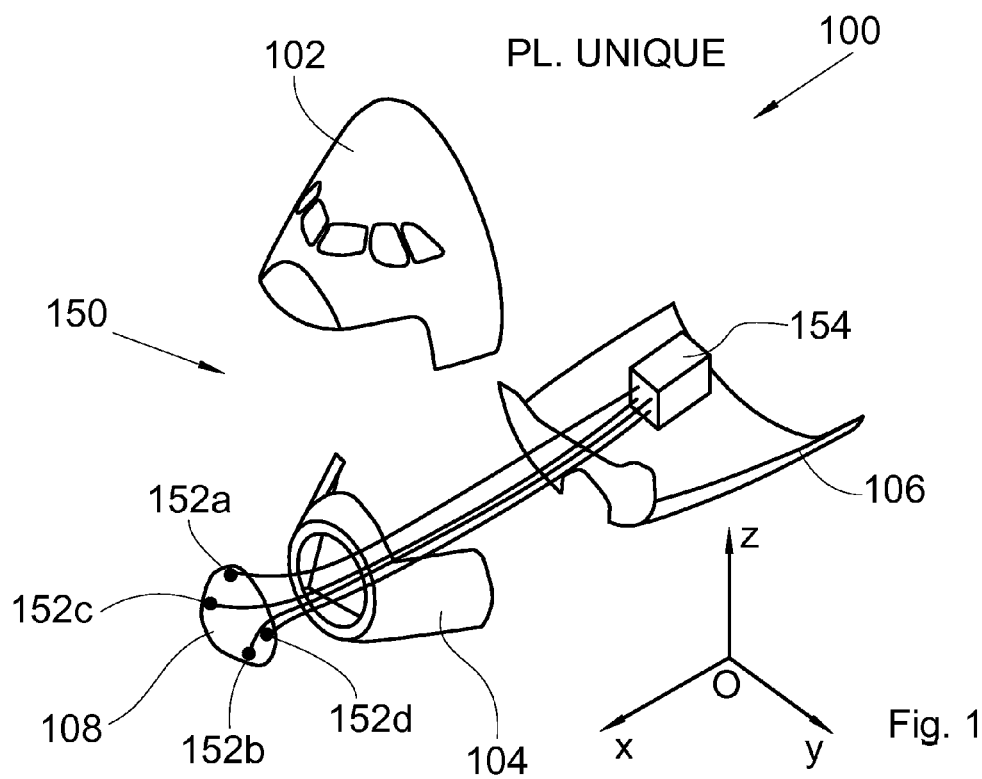
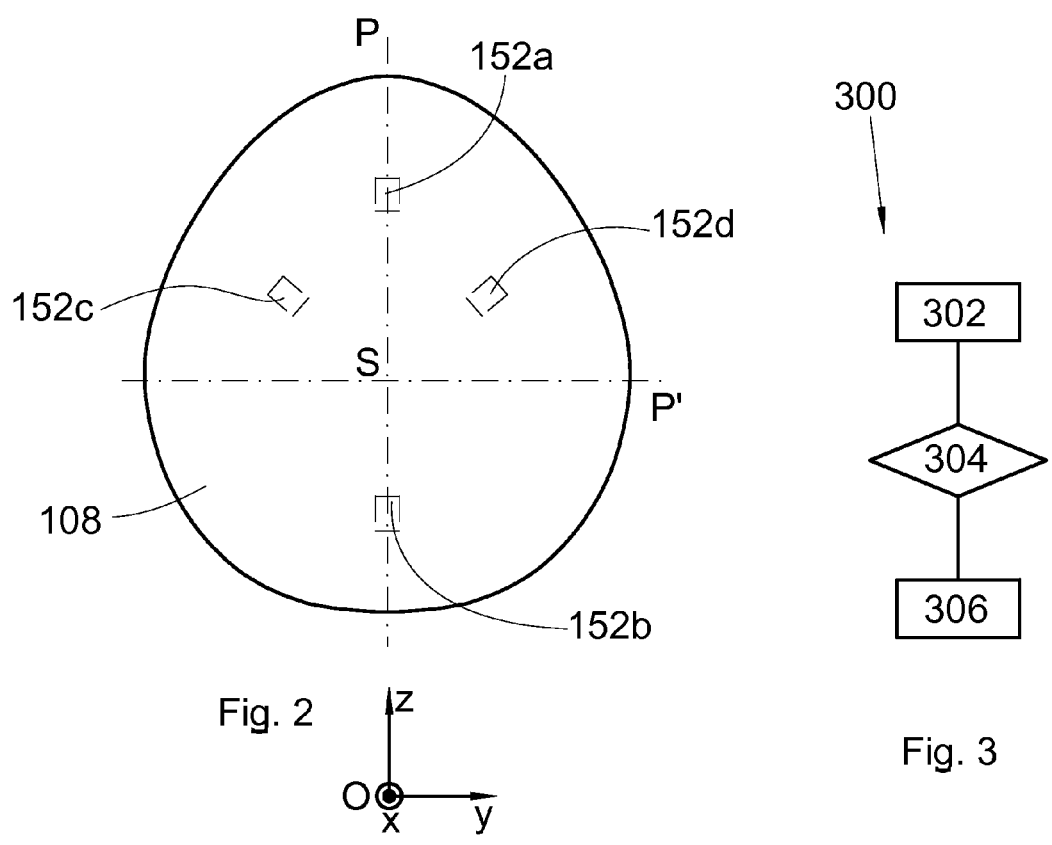

MEASUREMENT SYSTEM FOR MEASURING THE VELOCITY OF AN AIRCRAFT

CROSS-REFERENCE TO RELATED APPLICATION

This application claims the benefit of and priority to French patent application No. 14 54230 filed on May 13, 2014, the entire disclosure of which is incorporated by reference herein.

BACKGROUND

The present disclosure relates to a system for measuring characteristics of the velocity vector of an aircraft in relation to a surrounding air mass, such as the velocity, angle of attack, and angle of sideslip of the aircraft.

The disclosure herein also relates to an aircraft equipped with such a measurement system and also to a method for updating such a measurement system.

Currently, the characteristics of the velocity vector of an aircraft are measured with the aid of sensors placed in the flow of air surrounding the aircraft. Thus, the velocity of an aircraft is measured with the aid of pitot tubes, the angle of attack of an aircraft is measured by angle of attack probes, and the angle of sideslip of an aircraft, on some aircraft, is measured by sideslip probes.

In some conditions these sensors may give false indications. For example, when they are blocked or obstructed by water or frost.

It is therefore beneficial to have another means for measuring the characteristics of the velocity vector of the aircraft.

SUMMARY

An object of the present disclosure is to provide a system for measuring characteristics of the velocity vector of an aircraft that does not have the disadvantages of the prior art.

To this end, a measurement system to measure characteristics of the velocity vector of an aircraft in relation to a surrounding air mass is disclosed, the measurement system comprising:
  two primary sensors fixed to a frontal surface of the aircraft, each sensor being able and configured to deliver an output value relating the deformation experienced by the sensor, and
  a processing unit able to receive the output values and able to calculate the angle of attack and/or the velocity of the aircraft on the basis of these output values.

Such a system does not present the same risks of failure as the sensors of the prior art and gives indications of the velocity vector that make it possible to augment the information given by the other navigation systems.

The measurement system advantageously also comprises two complementary sensors, each complementary sensor being fixed to the frontal surface and able to deliver an output value relating to the deformation experienced by the sensor, and the processing unit is able to receive the output values of the two complementary sensors and to calculate an angle of sideslip of the aircraft on the basis of these output values.

The frontal surface is advantageously a radome arranged at the front of the aircraft.

One of the primary sensors is advantageously disposed at the top part of the radome, and the other primary sensor is disposed at the bottom part of the radome.

The two primary sensors are advantageously disposed on a plane of symmetry P of the radome.

The two complementary sensors are advantageously disposed symmetrically on either side of a plane of symmetry P of the radome.

For each sensor, the variation of the output value is advantageously proportional to the deformation experienced by the sensor.

The processing unit advantageously comprises:
  a receiver to receive a series of values of the angle of attack, the velocity, and possibly the angle of sideslip from other instruments of the aircraft,
  a comparer to compare each series of values thus received with the corresponding series of values calculated on the basis of the output values, and
  an updater to update the corresponding coefficients and/or constants for which the comparer has emitted a negative signal.

The disclosure herein also proposes an aircraft comprising a frontal surface and a measurement system according to one of the preceding variants.

The disclosure herein also proposes a method for updating a measurement system according to a preceding variant, the method comprising:
  a receiving step, during which the processing unit receives a series of values of the angle of attack, of the velocity, and possibly of the angle of sideslip from other instruments of the aircraft,
  a step of comparison, during which the processing unit compares the series of values thus received with the corresponding series of values calculated on the basis of the output values,
  for each pair of series of values thus compared, when the comparison is negative, an updating step, during which the processing unit updates the corresponding coefficients and/or constants.

BRIEF DESCRIPTION OF THE DRAWINGS

The above-mentioned features of the disclosure herein, as well as others, will become clearer upon reading the following description of an exemplary embodiment, the description being provided with reference to the accompanying drawings, in which:

FIG. 1 shows an exploded view of the front part of an aircraft according to the disclosure herein;

FIG. 2 shows the front view of a radome of an aircraft; and

FIG. 3 shows a flowchart of an updating method according to the disclosure herein.

DETAILED DESCRIPTION

In the following description the terms relating to a position are taken with reference to FIG. 1, in which an aircraft has a longitudinal axis x, a transverse axis along the axis y, and a vertical axis along the axis z.

FIG. 1 shows the front part 100 of an aircraft in a surrounding air mass.

In the embodiment of the disclosure herein presented here, the front part 100 comprises:
  a cockpit 102,
  a lower structure 106 fixed beneath the cockpit 102, a chin fairing 104 fixed in front of the lower structure 106, and a radome 108 fixed in front of the chin fairing 104.

The radome 108 assumes there the form of a dome having an axis x with an apex S and a plane of symmetry P passing through S and parallel to the vertical axis z.

FIG. 2 shows the front view of the radome 108 arranged at the front of the aircraft and constituting a frontal surface of the aircraft.

The front part 100 also has a measurement system 150 to measure characteristics of the velocity vector of the aircraft in relation to the surrounding air mass. These characteristics of the velocity vector may be the value of the velocity, the angle of attack and/or the angle of sideslip of the aircraft. The measurement system 150 comprises:

the radome 108 of the aircraft, two primary sensors 152*a-b*, each being fixed to the radome 108, and able to deliver an output value relating to the deformation experienced by the sensor, and a processing unit 154 able to receive the output values and able to calculate the angle of attack and/or the velocity of the aircraft on the basis of these output values.

Such a measurement system 150 therefore is not disturbed by the ambient conditions and can thus deliver reliable velocity information. The placement of the primary sensors 152*a-b* on the radome 108 is particularly interesting because the radome 108 is a lightweight part, which is not structural and which deforms relatively easily under the action of the pressure.

The primary sensors 152*a-b* are more particularly fixed inside the radome 108 and are thus presented in a transparent view in FIG. 2.

In the embodiment of the disclosure herein presented, the processing unit 154 is disposed on the lower structure 106, but could also be disposed in the aircraft and could even be integrated in the pre-existing electronic systems.

The processing unit 154 is able to transmit the velocity and angle of attack information to a display housed in the cockpit 102 so as to provide this information to the pilot.

Here, information is transmitted between each primary sensor 152*a-b* and the processing unit 154 by wired connection.

Each primary sensor 152*a-b* is a strain gauge of which the variation of the output value is proportional to the deformation experienced by the sensor.

In order to determine the angle of attack, one of the primary sensors 152*a* is disposed at the top part of the radome 108 and the other primary sensor 152*b* is disposed at the bottom part of the radome 108, i.e. on either side of a plane P' passing through the apex S and parallel to the transverse axis y.

For reasons of symmetry, the two primary sensors 152*a* and 152*b* are disposed over the plane of symmetry P of the radome 108.

The angle of attack can be evaluated on the basis of a formula of the type:

$$\alpha = K_\alpha \frac{g_b - g_a}{g_b + g_a} + A \quad (1)$$

where $\alpha$ is the angle of attack, $K_\alpha$ is the linear coefficient of the primary sensors 152*a-b* relating to the angle of attack, A is a constant, and $g_a$ and $g_b$ are the values given by the primary sensors 152*a-b*. The coefficient $K_\alpha$ and the constant A are determined by calculation, for example by performing simulations of the deformation of the radome 108 under the effect of the pressure of the air, or by way of experiment. As the case may be, the value thereof may be different depending on the value ranges of the different sensors, so as to take into account any non-linear effects of the deformation of the radome 108.

The calibrated airspeed can be evaluated on the basis of a formula of the type:

$$V_c = f(P_T - P_S) \quad \text{Equation (2)}$$

where $V_c$ is the calibrated airspeed, $f$ is a function, $P_T$ is the total pressure, and $P_S$ is the static pressure.

The static pressure can be determined on the basis of suitable measurement instruments or on the basis of data such as GPS altitude.

The total pressure can be obtained by a formula of the type:

$$P_T = K_1(g_a + g_b) + B \quad \text{Equation (3)}$$

where $K_1$ is a linear coefficient of the primary sensors 152*a-b* relating to the pressure and B is a constant.

In accordance with an alternative, the output values of the primary sensors 152*a-b* are representative of the difference $(P_T - P_S)$, since the pressure within the radome 108 is substantially equal to $P_S$.

The pressure difference can be obtained by a formula of the type:

$$P_T - P_S = K_2(g_a + g_b) + C \quad \text{Equation (4)}$$

where $K_2$ is a coefficient relating to the pressure difference, and C is a constant.

The coefficients $K_1$, $K_2$ and the constants B, C are determined by calculation, for example by performing simulations of the deformation of the radome 108 under the effect of the pressure of the air, or by way of experiment. As the case may be, the value thereof may be different depending on the value ranges of the different sensors, so as to take into account any non-linear effects of the deformation of the radome 108.

In order to measure the angle of sideslip of the aircraft, the measurement system 150 comprises two complementary sensors 152*c-d*, which are preferably of the same type as the two primary sensors 152*a-b* and are connected to the processing unit 154.

The two complementary sensors 152*c-d* are disposed symmetrically on either side of the plane of symmetry P.

Each complementary sensor 152*c-d* is also fixed to the radome 108 and is able to deliver an output value relating to the deformation experienced by the sensor, and the processing unit 154 is then able to receive the output values and to calculate the angle of sideslip of the aircraft on the basis of these output values.

The angle of sideslip can be evaluated on the basis of a formula of the type:

$$\beta = K_\beta \frac{g_d - g_c}{g_d + g_c} + D \quad (5)$$

where $\beta$ is the angle of sideslip, $K_\beta$ is the linear coefficient of the complementary sensors 152*c-d* relating to the sideslip angle, D is a constant, and $g_c$ and $g_d$ are the values given by the complementary sensors 152*c-d*. The coefficient $K_\beta$ and the constant D are determined by calculation, for example by performing simulations of the deformation of the radome 108 under the effect of the pressure of the air, or by way of experiment. As the case may be, the value thereof may be different depending on the value ranges of the different sensors, so as to take into account any non-linear effects of the deformation of the radome 108.

The characteristics of the sensors 152a-d and of the radome 108 may vary over the course of time and from one aircraft to another, and it is thus preferable to devise an updating method during which the values of the different coefficients $K_\alpha$, $K_1$, $K_2$, $K_\beta$ and the constants A, B, C, D are updated.

FIG. 3 shows a flowchart of an updating method 300.

In the case in which the measurement system 150 measures the angle of attack and the velocity of the aircraft, the updating method comprises:

a receiving step 302, during which the processing unit 154 receives a series of values of the angle of attack and of the velocity from other instruments of the aircraft, for example velocity values given by the pitot tubes and angle of attack values given by the angle of attack probes, a comparison step 304, during which the processing unit 154 compares the series of values thus received with the corresponding series of values calculated on the basis of the output values, for each pair of series of values thus compared, when the comparison is negative, an updating step 306, during which the processing unit 154 updates the corresponding coefficient $K_\alpha$, $K_1$, $K_2$ and/or constants A, B, C.

When the comparison is positive there is no update.

The comparison is negative when the difference, in absolute value, between a pair of compared values or between the averages of compared value series is greater than a predetermined threshold, and the comparison is positive when the difference, in absolute value, between the compared value pairs or between the averages of the compared value series is below this predetermined threshold.

The update comprises finding the coefficient $K_\alpha$, $K_1$, $K_2$ and/or the constants A, B, C for which the output values give the received values, it being sufficient for this purpose to perform a digital interpolation in order to calculate the angle of attack and the velocity on the basis of the output values.

In the case in which the measurement system 150 also measures the angle of sideslip of the aircraft, the receiving step 302 also comprises, for the processing unit 154, receiving a series of values of the angle of sideslip from other instruments of the aircraft, these being values given by sideslip probes, for example, the comparison step 304 also comprises, for the processing unit 154, comparing the series of values of the angle of sideslip thus received with the corresponding values calculated on the basis of the output values, for this pair of series of values thus compared, when the comparison is negative, the updating step 306 comprises, for the processing unit 154, updating the corresponding coefficient $K_\beta$ and/or constant D.

The processing unit 154 comprises, to this end:

a receiver to receive a series of values of the angle of attack, of the velocity, and possibly of the angle of sideslip from other instruments of the aircraft, a comparer to compare each series of values thus received with the corresponding series of values calculated on the basis of the output values, and an updater to update the corresponding coefficient $K_\alpha$, $K_1$, $K_2$, $K_\beta$ and/or constants A, B, C, D for which the comparer has emitted a negative signal.

In order to prevent the updates from introducing errors in the coefficients $K_\alpha$, K, $K_\beta$, and the constants A, B, C, D, the updating method can be performed taking into account the values collected over a relatively long period, for example the data collected during a previous flight. The values taken into account are, in this case, preferably those that have been collected over periods during which the measurements taken by the other instruments of the aircraft are assured, for example when the flight conditions are such that there is not risk of freezing of the pitot tubes or other sensors.

In the embodiment of the disclosure herein described above, the sensors are fixed to the radome of the aircraft, which is particularly suitable for measuring characteristics of the velocity vector of the aircraft. In fact, the location of the radome at the end of the front point allows it to directly receive the pressure exerted by the flow of air, without interference. In addition, because the radome is not a structural part of the aircraft, it has a relatively low rigidity, enabling it to deform relatively easily under the action of the pressure of the air.

It is, however, also possible to implement the disclosure herein on another frontal surface of the aircraft, i.e. on another surface in frontal contact with the flow of air resulting from the displacement of the aircraft. This frontal surface may be another surface of the fuselage nose of the aircraft, or an edge of attack of a wing, or the tail unit of the aircraft.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A measurement system for measuring characteristics of a velocity vector of an aircraft in relation to a surrounding air mass, the measurement system comprising:
    a radome arranged at a front of the aircraft;
    two primary sensors, wherein each sensor is a strain gauge fixed to and inside the radome and is configured to deliver output values for a deformation experienced by the sensor; and a processing unit configured to receive the output values and to calculate an angle of attack and/or a velocity of the aircraft from the output values,
wherein the processing unit comprises:
- a calculator configured to calculate the angle of attack, the velocity, and/or an angle of sideslip from formulas based on coefficients and constants;
- a receiver configured to receive a series of values of the angle of attack, the velocity, and/or the angle of sideslip from other instruments of the aircraft;
- a comparer to compare each series of values thus received with a corresponding series of values calculated on the basis of the output values; and
- an updater to update the corresponding coefficients and/or constants for which the comparer has emitted a negative signal.

2. The measurement system of claim 1, further comprising two complementary sensors, wherein each complementary sensor is fixed inside the radome and is configured to deliver output values for a deformation experienced by the complementary sensor, and wherein the processing unit is configured to receive the output values of the two complementary sensors and to calculate an angle of sideslip of the aircraft from the output values.

3. The measurement system of claim 2, wherein the two complementary sensors are disposed symmetrically on either side of a plane of symmetry of the radome.

4. The measurement system according to claim 1, wherein one of the primary sensors is disposed at a top part of the radome and the other primary sensor is disposed at a bottom part of the radome.

5. The measurement system of claim 4, wherein the two primary sensors are disposed on a plane of symmetry of the radome.

6. The measurement system of claim 1, wherein a variation of the output value of each sensor is proportional to the deformation experienced by the sensor.

7. An aircraft comprising at least one measurement system according to claim 1.

8. A method for updating the measurement system of claim 1, comprising:
- a calculation step during which an angle of attack, a velocity, and/or an angle of sideslip are calculated from formulas based on coefficients and constants;
- a receiving step, during which the processing unit receives a series of values of the angle of attack, of the velocity, and/or of the angle of sideslip from other instruments of the aircraft;
- a step of comparison, during which the processing unit compares the series of values thus received with corresponding series of values calculated from the output values; and
- an updating step for each pair of series of values thus compared, during which the processing unit updates the corresponding coefficients and/or constants when the comparison is negative.

9. A measurement system for measuring characteristics of a velocity vector of an aircraft in relation to a surrounding air mass, the measurement system comprising:
- a radome arranged at a front of the aircraft;
- two primary sensors, wherein each sensor is a strain gauge fixed to and inside the radome and is configured to deliver output values for a deformation experienced by the sensor; and
- a processing unit configured to receive the output values and to calculate an angle of attack of the aircraft from the output values according to the equation $$\alpha = K_\alpha \frac{g_b - g_a}{g_b + g_a} + A,$$

wherein $\alpha$ is the angle of attack, $K_\alpha$ is a linear coefficient of the primary sensors relating to the angle of attack, A is a constant, and $g_a$ and $g_b$ are the output values of the primary sensors.

* * * * *